United States Patent [19]

Nagao

[11] Patent Number: 4,842,566
[45] Date of Patent: Jun. 27, 1989

[54] EYE DEVICE FOR USE IN A DOLL

[75] Inventor: Keisuke Nagao, Ichikawa, Japan

[73] Assignee: Kabushiki Kaisha Nagao, Chiba, Fed. Rep. of Germany

[21] Appl. No.: 58,043

[22] Filed: Jun. 4, 1987

[30] Foreign Application Priority Data

Sep. 5, 1986 [JP] Japan .............................. 61-136142
Oct. 31, 1986 [JP] Japan .............................. 61-167573

[51] Int. Cl.⁴ .................. A63H 3/40; A63H 3/38; B25G 3/02
[52] U.S. Cl. .................................. 446/345; 446/392; 403/361
[58] Field of Search ............... 403/361, 360; 446/345, 446/392, 337, 341, 342, 343, 344, 346, 347, 348, 349, 351, 389, 391, 393

[56] References Cited

U.S. PATENT DOCUMENTS

| 463,443 | 11/1891 | Davidson | 403/361 X |
| 3,000,136 | 9/1961 | Cohn | 446/346 |
| 4,012,155 | 3/1977 | Morris | 403/360 X |
| 4,233,776 | 11/1980 | Suzuki | 446/392 |
| 4,705,488 | 11/1987 | Bohl, Jr. et al. | 446/393 |

FOREIGN PATENT DOCUMENTS

| 225148 | 10/1959 | Australia | 446/392 |
| 2444481 | 8/1980 | France | 446/392 |
| 2470301 | 6/1981 | France | 446/343 |
| 2045095 | 10/1980 | United Kingdom | 446/346 |
| 2070448 | 4/1981 | United Kingdom | 446/343 |
| 2182257 | 5/1987 | United Kingdom | 446/392 |

Primary Examiner—Richard J. Johnson
Assistant Examiner—D. Neal Muir
Attorney, Agent, or Firm—Toren, McGeady & Associates

[57] ABSTRACT

An eye device for a doll or the like which comes to the eye-closed state by placing the doll in a lying posture and then comes to the eye-open state by placing the doll in a standing or sitting posture. This device is firmly held onto the doll face to such a degree that even if the eye member is strongly pressed from the front side, there is no apprehension of the eye member detaching from its holding position on the doll face. To this end the eye device includes at least one circular engaging step portion on the periphery of an eyeball-mounting body and, optionally, at least one circular engaging groove and/or steps on an inner periphery of a mounting member whereby material of the doll face, sandwiched between the eyeball-mounting body and the mounting member, is engaged by the circular engaging step portion on the eyeball-mounting body and, optionally, also by the circular engaging groove and/or steps on the mounting member, thereby preventing detaching of the eye device.

4 Claims, 13 Drawing Sheets

EYE DEVICE FOR USE IN A DOLL

BACKGROUND OF THE INVENTION

1. FIELD OF THE INVENTION

The present invention generally relates to an eye device for use in a doll, and, more particularly, to the improvement in an eye device to be placed at a recess on the surface of the face portion of a stuffed doll which can be changed into the sleeping posture by closing the doll's eyes or into the awaking posture by opening the doll's eyes.

2. DESCRIPTION OF RELATED ART

In such typical conventional structures of the eye device for use in a doll, it is a general practice that the supporting member is located inside the cloth used for the face portion and engaged herewith. Due to such a structure, it is inevitable that when the eye structure in the doll face is repeatedly pushed or urged inwardly from the surface thereof, as is often done by children when they play with their dolls, the face material cloth may be worn and torn in the area around the eye structure, and finally the doll eye could come off and be lost.

In the Japanese Utility Model Laid Open No. 60-124890, there is disclosed an attaching means for the eye member which comprises an eyeball and an eyeball-mounting body. In this attaching means, use is made of a synthetic resin circular plate having many tongue portions on an inner periphery thereof.

The eye member is held firmly so as not to detach from the doll face by the tongue portions of the synthetic resin circular plate which is fitted in the circular fitting groove provided on the periphery portion in the front side and the outer periphery of the eye member.

Even in the above-mentioned laid-open structure, the eye member sometimes detaches from the doll face when the eye structure in the doll face is repeatedly pushed or urged inwardly from the surface thereof.

SUMMARY OF THE INVENTION

An object of the invention is to provide an eye device which is firmly held on a doll face.

Another object of the invention is to provide the means to effectively attach an eye device on the cloth which forms a doll face.

DETAILED DESCRIPTION OF THE INVENTION

Figure 1:
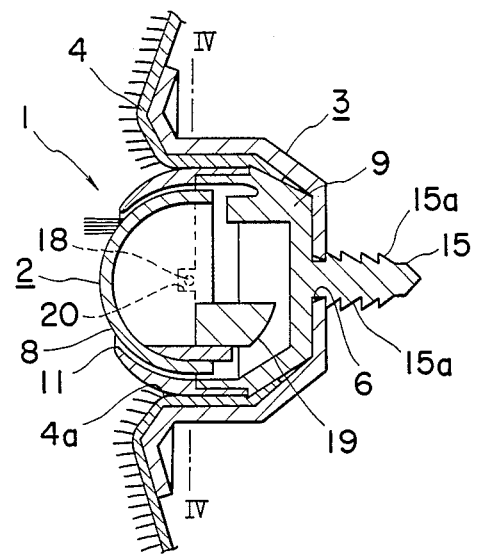
FIG. 1 is a vertical cross-sectional view showing a first embodiment of the present invention.
Figure 2:
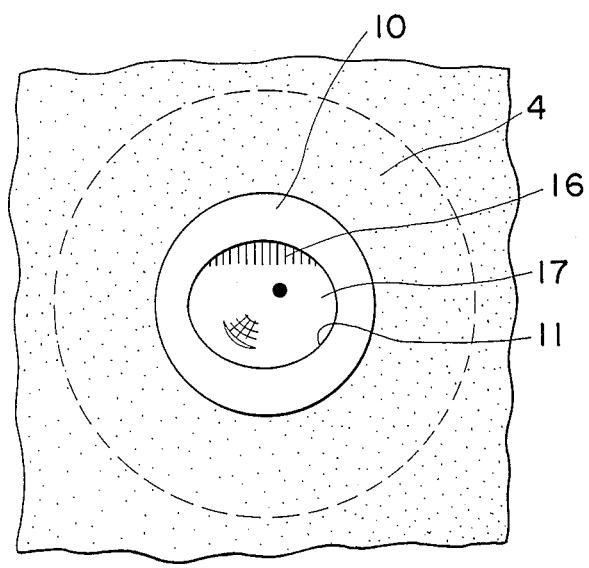
FIG. 2 is a front view showing the first embodiment of the present invention.
Figure 3:
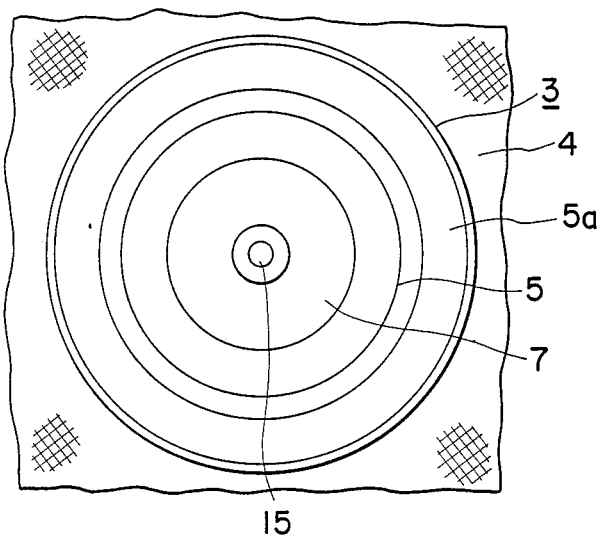
FIG. 3 is a rear view showing the first embodiment of the present invention.
Figure 4:
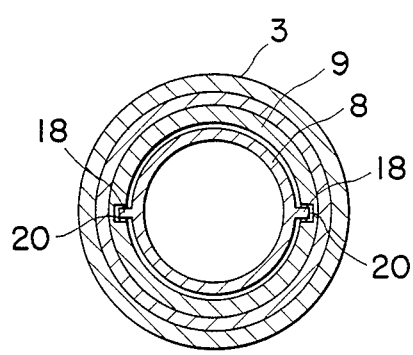
FIG. 4 is a vertical cross-sectional view taken along the plane designated with the line IV—IV in FIG. 1 in the first embodiment.

A preferred embodiment of the present invention will be described referring to the accompanying drawings.

Referring to FIGS. 1 through 5, there is shown an eye device for use in a doll according to the first embodiment of the present invention, an eye device 1 being composed of an eye member 2 and a synthetic resin cup-shaped mounting member 3. The eye device is provided on the surface at the front side of an eye member-mounting portion 4 of a face material fabric or cloth having an aperture 4a therethrough.

Figure 6:
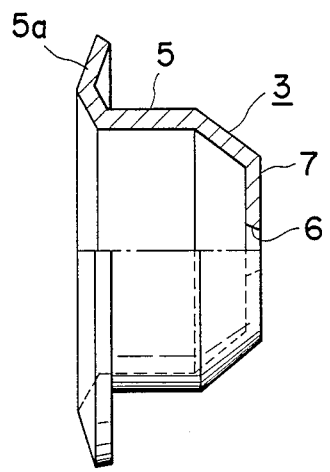
FIG. 6 is a side view of the synthetic resin cup-shaped mounting member showing the cross section of the upper half portion in the first embodiment.
Figure 7:
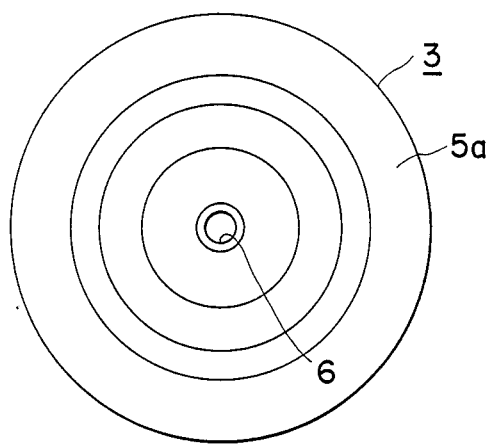
FIG. 7 is a front view of the synthetic resin cup-shaped member mounting member in the first embodiment.

As shown in FIG. 6 and FIG. 7, the synthetic resin cup-shaped mounting member 3 is provided with a peripheral wall portion 5 having a circular flange portion 5a and an inserting hole 6 which is tapered toward the outside of the central portion of the rear end wall portion 7.

Figure 5:
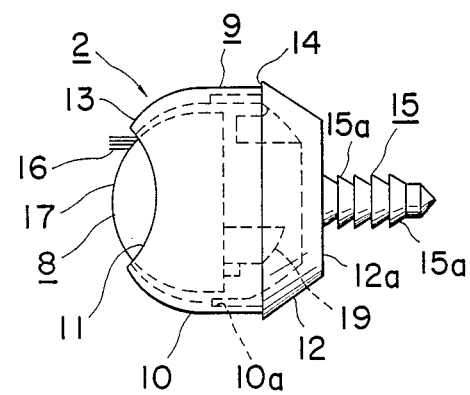
FIG. 5 is a side view of the eye member in the first embodiment.

Referring to FIG. 1 and FIG. 5, the eye member 2 is constructed so that an eyeball 8 is mounted inside of an eye-ball mounting body 9, which comprises a front side member 10, having an opening 11 of an ellipse-shape or round shape, and a rear side member 12 which is fitted at a fitting step portion 10a of the front side member 10, which forms the eye edge cosmetic portion 13. A circular engagement step portion 14 is formed at the front end outer periphery of the rear side member 12.

The outer periphery of the rear side member 12 is larger than the outer periphery of the front side member 10 with respect to the circular engaging step portion 14.

A projecting bar portion 15 extends rearwardly from a central portion of the rear end surface 12a in the rear side member 12. Engaging steps 15a are formed on the outer periphery of the projecting bar portion 15, the engaging steps 15a being continuously inclined towards the rear end surface 12a. The eyeball 8 is formed of a substantially hemispherical hollow structure or frame made of synthetic resin material and is provided with an eyelash 16 on the upper portion of the hemispherical hollow structure or frame. A pupil 17 is formed on a portion of the hemispherical hollow structure below the eyelash 16. Pivot pins 18 are provided projecting outwardly at positions corresponding to both ends of a diameter line passing through the center of the substantially hemispherical hollow structure or frame. A weight 19 is fixed rigidly onto the bottom portion of an inner surface of the eyeball 8 and is biased toward the rear of the eyeball 8. The pivot pins 18 of the eyeball 8 engage with engaging grooves 20 oppositely provided on the inner surface of the eyeball-mounting body 9. The eyelash 16 is exposed from the opening 11. The eyeball 8 is rotatably set into the eyeball-mounting body 9 by means of the pivot pins 18. The eyelash 16 abuts on the upper edge of the opening 11 when the eye is in the open condition and abuts on the lower edge of the opening 11 when the eye is in the closing condition.

The eye member 2 to be mounted on the eye member-mounting portion 4 of the front surface of the stuffed doll's face is attached in such a manner as mentioned below.

The eye member 2 is inserted into the aperture 4a of the eye member-mounting portion 4 of the doll face and then the projecting bar portion 15 is inserted into the inserting hole 6 while gradually spreading the inserting hole 6, and as a result the projecting bar portion 15 projects beyond the surface of the rear side portion of the hemispherical hollow structure or frame.

The periphery of the aperture 4a of the cloth abuts on the outer peripheral surface of the eye member 2 and also on the inner surface of the synthetic resin cup-shaped mounting member 3. The periphery of the eye member-mounting portion 4 is held between the circular engaging step portion 14 of the eye member 2 and the circular outer peripheral surface of the synthetic resin cup-shaped mounting member 3.

The flange portion 5a of the synthetic resin cup-shaped mounting member 3 abuts on the back surface of the eye member-mounting portion 4 of the cloth, the engaging steps 15a of the projecting portion 15 being engaged with the inserting hole 6.

As a result, the eye member 2 is rigidly set by the synthetic resin cup-shaped mounting member 3.

In such a manner, the eye member 2 does not detach from the doll face even if the eye member 2 is strongly pushed or urged from the front surface of the doll face, since the engaging steps 15a of the projecting bar portion 15 engage with the periphery of the inserting hole 6 and the periphery of the aperture 4a of the eye member-mounting portion 4 is held rigidly between the circular engaging step portion 14 of the eye member 2 and the outer peripheral surface of the synthetic resin cup-shaped mounting member 3.

Referring to FIGS. 8 through 13, there is shown an eye device for use in a doll according to the second embodiment of the present invention, in which an eye device 21 is composed of an eye member 22 and a synthetic resin cup-shaped mounting member 23 and is provided on the surface at the front side of an eye member-mounting portion 24 of a face material fabric or cloth having an aperture 24a therethrough.

Figure 12:
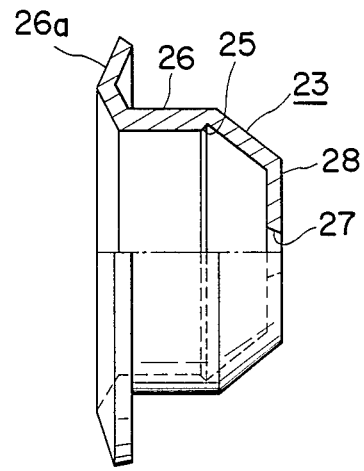
FIG. 12 is a side view of the synthetic resin cup-shaped mounting member showing cross-section of the upper half portion in the second embodiment.
Figure 13:
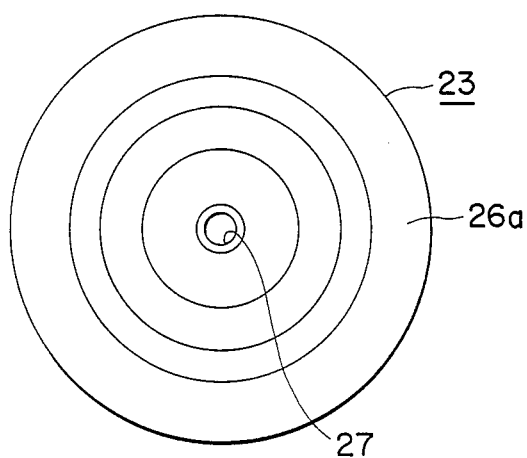
FIG. 13 is a front view of the synthetic resin cup-shaped mounting member in the second embodiment.

As shown in FIG. 12 and FIG. 13, the synthetic resin cup-shaped mounting member 23 is provided with a circular engaging groove 25 on an inner periphery thereof, the groove 25 being formed in the rear portion of the peripheral wall portion 26 having a circular flange portion 26a.

The synthetic resin cup-shaped mounting member 23 is also provided with an inserting hole 27 which is tapered toward the outside of the central portion of the rear end wall portion 28.

Figure 8:
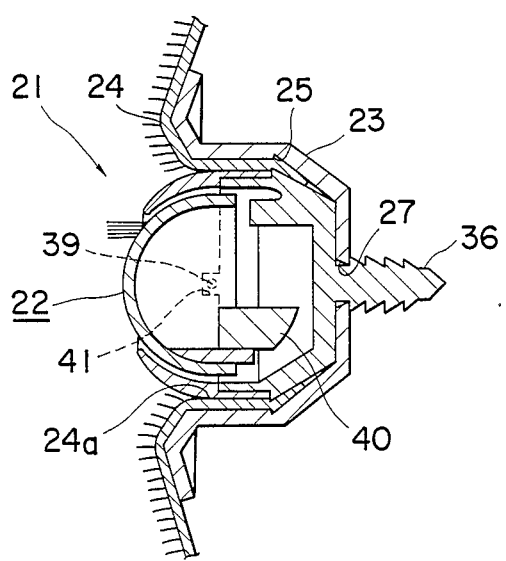
FIG. 8 is a vertical cross-sectional view showing a second embodiment of the present invention.
Figure 9:
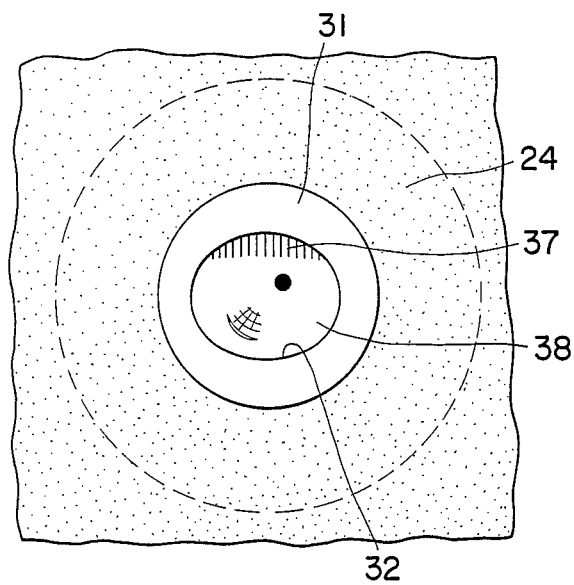
FIG. 9 is a front view showing the second embodiment of the present invention.
Figure 10:
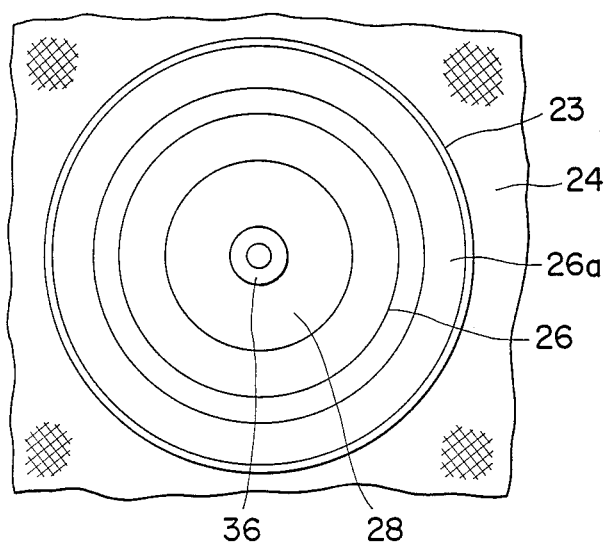
FIG. 10 is a rear view showing the second embodiment of the present invention.
Figure 11:
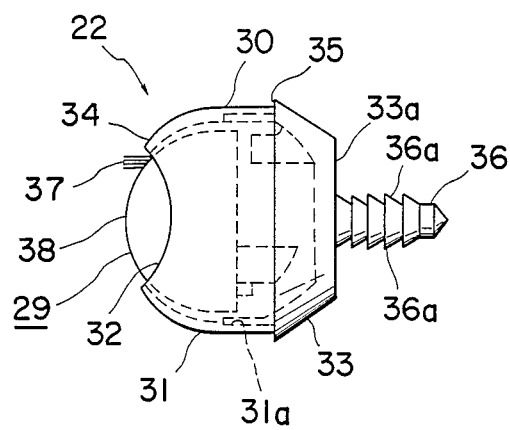
FIG. 11 is a side view of the eye member in the second embodiment.

Referring to FIG. 8 and FIG. 11, the eye member 22 is constructed so that an eyeball 29 is mounted inside of an eyeball-mounting body 30, which comprised a front side member 31 having an opening 32 of an ellipse-shape or round shape and a rear side member 33 which is fitted at the fitting step portion 31a of the front side member 31, which forms the eye edge cosmetic portion 34. A circular engaging step portion 35 is formed at the front end outer periphery of the rear side member 33.

The outer periphery of the rear side member 33 is larger than the outer periphery of the front side member 31 with respect to the circular engaging step portion 35.

A projecting bar portion 36 extends rearwardly from a central portion of the rear end surface 33a in the rear side member 33. Engaging steps 36a are formed on the outer periphery of the projecting bar portion 36, the engaging steps 36a being continuously inclined towards the rear end surface 33a. The eyeball 29 is formed of a substantially hemispherical hollow structure or frame made of synthetic resin material and is provided with an eyelash 37 on the upper portion of the hemispherical hollow structure or frame. A pupil 38 is formed on a portion of the hemispherical hollow structure below the eyelash 37. Pivot pins 39 are provided projecting outwardly at positions corresponding to both ends of a diameter line passing through the center of the substantially hemispherical hollow structure or frame. A weight 40 is fixed rigidly onto the bottom portion of an inner surface of the eyeball 29 and is biased toward the rear of the eyeball 29. The pivot pins 39 of the eyeball 29 engage with the engaging grooves 41 oppositely provided on the inner surface of the eyeball-mounting body 30. The eyelash 37 is exposed from the opening 32. The eyeball 29 is rotatably set into the eyeball-mounting body 30 by means of the pivot pins 39. The eyelash 37 abuts on the upper edge of the opening 32 when the eye is in the open condition and abuts on the lower edge of the opening 32 when the eye is in the closed condition.

The eye member 22 is inserted into the aperture 24a of the eye member-mounting portion 24 and then the projecting bar portion 36 is inserted into the inserting hole 27 while gradually spreading the inserting hole 27, and as a result the projecting bar portion 36 projects beyond the surface of the rear side portion of the hemispherical hollow structure or frame.

The periphery of the aperture 24a of the cloth abuts on the outer peripheral surface of the eye member 22 and also on the inner surface of the synthetic resin cup-shaped mounting member 23. The periphery of the aperture 24a of the eye member-mounting portion 24 of the cloth is held between the circular engaging step portion 35 of the eye member 22 and the circular engaging groove 25 of the synthetic resin cup-shaped mounting member 23.

The flange portion 26a of the synthetic resin cup-shaped mounting member 23 abuts on the back surface of the eye-member mounting portion 24 of the cloth, the engaging steps 36a of the projecting bar portion 36 being engaged with the inserting hole 27.

As a result, the eye member 22 is rigidly set by the synthetic resin cup-shaped mounting member 23.

In such a manner, the eye member 22 does not detach from the doll face even if the eye member 22 is strongly pushed or urged from the front surface of the doll face, since the engaging steps 36a of the projecting bar portion 36 engages with the periphery of the inserting hole 27 and the aperture 24a of the eye member-mounting portion 24 of the cloth is held rigidly between the circular engaging step portion 35 of the eye member 22 and the circular engaging groove 25 of the synthetic resin cup-shaped mounting member 23.

Figure 14:
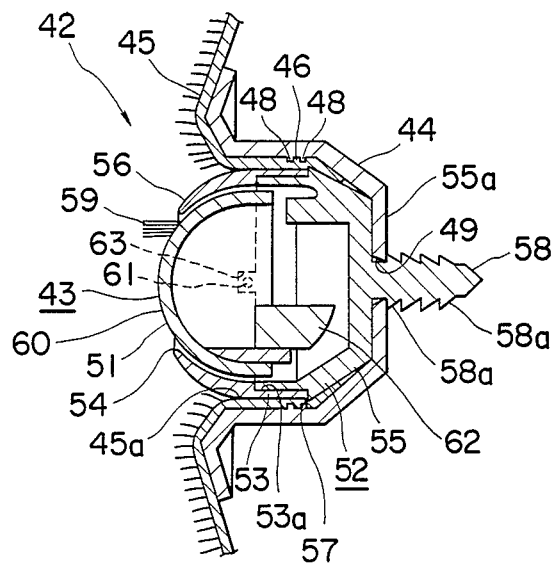
FIG. 14 is a vertical cross-section view showing a third embodiment of the present invention.
Figure 15:
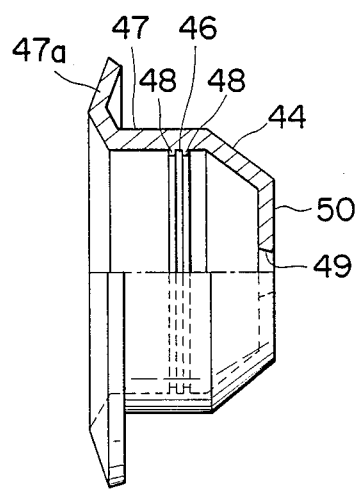
FIG. 15 is a side view of the synthetic resin cup-shaped mounting member showing the cross-section of the upper half portion in the third embodiment.
Figure 16:
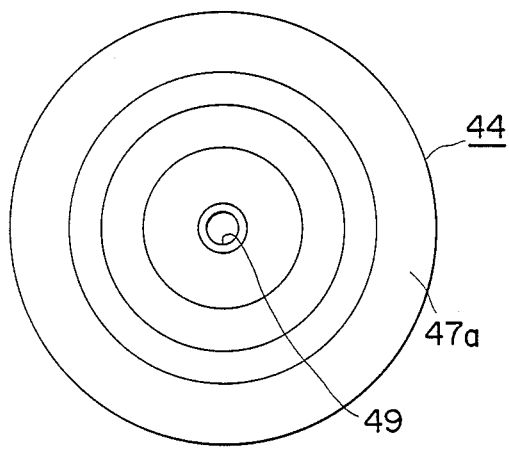
FIG. 16 is a front view of the synthetic resin cup-shaped mounting member in the third embodiment.

Referring to FIGS. 14 through 16, there is shown an eye device for use in a doll according to the third embodiment of the present invention, in which an eye device 42 is composed of an eye member 43 and a synthetic resin cup-shaped mounting member 44 and being provided on the surface at the front side of an eye member-mounting portion 45 of a face material fabric or cloth having an aperture 45a therethrough.

As shown in FIG. 15 and FIG. 16, the synthetic resin cup-shaped mounting member 44 is provided with a circular engaging groove 46 on an inner periphery thereof, the groove 46 being formed in the rear portion of a peripheral wall portion 47 having a circular flange portion 47a and also being formed between circular projecting steps 48.

The synthetic resin cup-shaped mounting member 44 is also provided with an inserting hole 49 which tapered toward the outside of the central portion of the rear end wall portion 50.

Referring to FIG. 14, the eye member 43 is constructed so that an eyeball 51 is mounted inside of an eyeball-mounting body 52, which comprises a front side member 53 having an opening 54 of an ellipse-shape or round shape and a rear side member 55 which is fitted at a fitting step portion 53a of the front side member 53, which forms portion 57 is formed at the front end outer periphery of the the eye edge cosmetic portion 56. A circular engaging step rear side member 55.

The outer periphery of the rear side member 55 is larger than the outer periphery of the front side member 53 with respect to the circular engaging step portion 57.

A projecting bar portion 58 extends rearwardly from a central portion of the rear end surface 55a in the rear side member 55. Engaging steps 58a are formed on the outer periphery of the projecting bar portion 58, the engaging steps 58 being continuously inclined towards the rear end surface 55a. The eyeball 51 is formed of a substantially hemispherical hollow structure or frame made of synthetic resin material and is provided with an eyelash 59 on the upper portion of the hemispherical hollow structure or frame. A pupil 60 is formed on a portion of the hemispherical hollow structure below the eyelash 59. Pivot pins 61 are provided projecting outwardly at positions corresponding to both ends of a diameter line passing through the center of the substantially hemispherical hollow structure or frame. A weight 62 is fixed rigidly onto the bottom portion of an inner surface of the eyeball 43 and is biased toward the rear of the eyeball 43. The pivot pins 61 of the eyeball 43 engage with the engaging grooves 63 oppositely provided on the inner surface of the eyeball-mounting body 52. The eyelash 59 is exposed from the opening 54. The eyeball 51 is rotatably set into the eyeball-mounting body 52 by means of the pivot pins 61. The eyelash 59 abuts on the upper edge of the opening 54 when the eye is in the open condition and abuts on the lower edge of the opening 54 when the eye is in the closed condition.

The eye member 43 is inserted into the aperture 45a of the eye member-mounting portion 45 and then the projecting bar portion 58 is inserted into the inserting hole 49 while gradually spreading the inserting hole 49, and as a result the projecting bar portion 58 projects beyond the surface of the rear side portion of the hemispherical hollow structure or frame.

The periphery of the aperture 45a of the cloth abuts on the outer surface of the eye member 43 and also on the inner surface of the synthetic resin cup-shaped mounting member 44. The periphery of the aperture 45a of the eye member-mounting portion 45 of the cloth is held between the circular engaging step portion 57 of the eye member 43 and the circular engaging groove 46 formed between circular projecting steps 48 of the synthetic resin cup-shaped mounting member 44.

The flange portion 47a of the synthetic resin cup-shaped mounting member 44 abuts on the back surface of the eye member mounting portion 45 of the cloth, the engaging steps 58a of the projecting bar portion 58 being engaged with the inserting hole 49.

As a result, the eye member 43 is rigidly set by the synthetic resin cup-shaped mounting member 44.

In such a manner, the eye member 43 does not detach from the doll face even if the eye member 43 is strongly pushed or urged from the front surface of the doll face, since the engaging steps 58a of the projecting bar portion 58 engage with the periphery of the inserting hole 49 and the aperture 45a of the eye member-mounting portion 45 of the cloth is held rigidly between the circular engaging step portion 57 of the eye member 43 and the circular engaging groove 46 of the syntheic resin cup-shaped mounting member 44.

Referring to FIGS. 17 through 22, there is shown an eye device for use in a doll according to the fourth embodiment of the present invention, in which an eye device 64 is composed of an eye member 65 and a synthetic resin cup-shaped mounting member 66 and being provided on the surface at the front side of an eye member-mounting portion 67 of a material fabric or cloth for a doll face having an aperture 67a therethrough.

Figure 21:
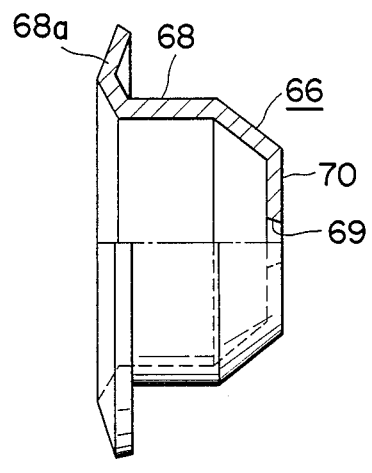
FIG. 21 is a side view of the synthetic resin cup-shaped mounting member showing the cross section of the upper half portion in the fourth embodiment.
Figure 22:
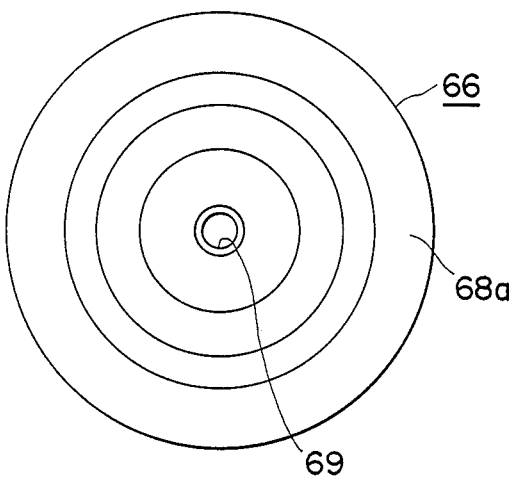
FIG. 22 is a front view of the synthetic resin cup-shaped mounting member in the fourth embodiment.

As shown in FIG. 21 and FIG. 22, the synthetic resin cup-shaped mounting member 66 is provided with a peripheral wall portion 68 having a circular flange portion 68a.

The synthetic resin cup-shaped mounting member 66 is also provided with an inserting hole 69 which is tapered toward the outside of the central portion of the rear end wall portion 70.

Figure 17:
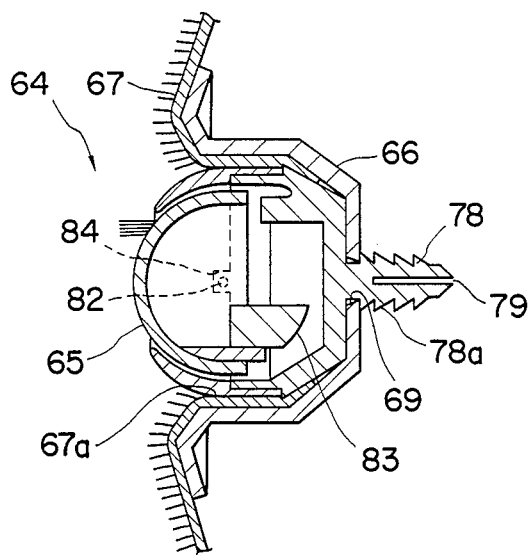
FIG. 17 is a vertical cross-sectional view showing a fourth embodiment of the present invention.
Figure 18:
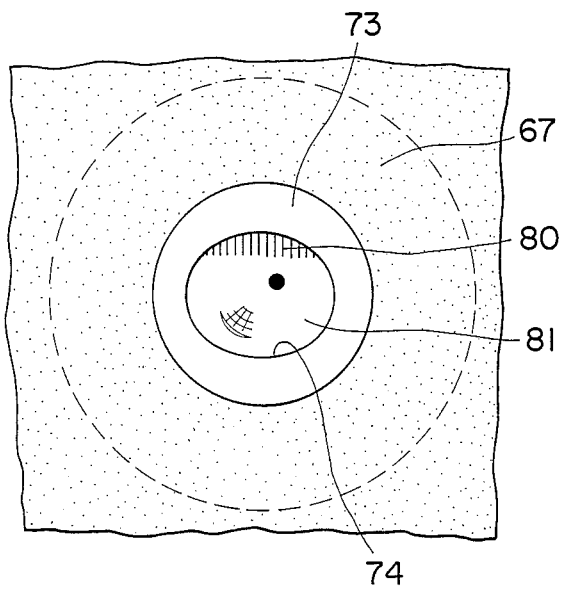
FIG. 18 is a front view showing the fourth embodiment of the present invention.
Figure 19:
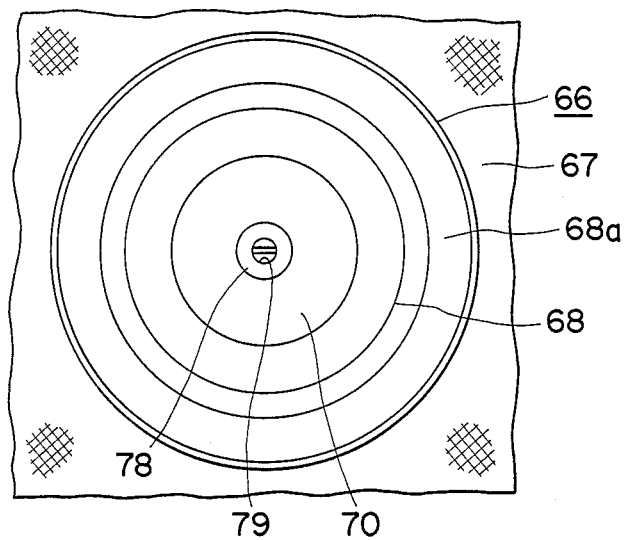
FIG. 19 is a rear view showing the fourth embodiment of the present invention.
Figure 20:
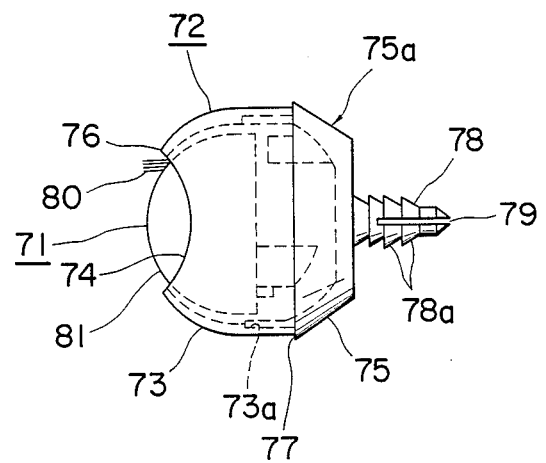
FIG. 20 is a side view of the eye member in the fourth embodiment.

Referring to FIG. 17 and FIG. 20, the eye member 65 is constructed so that an eyeball 71 is mounted inside of an eyeball-mounting body 72, which comprises a front side member 73 having an opening 74 of an ellipse shape or round shape and a rear side member 75 which is fitted at a fitting step portion 73a of the front side member 73, which forms the eye edge cosmetic portion 76. A circular engaging stp portion 77 is formed at the front end outer peripheral edge of the rear side member 75.

The front end outer peripheral edge of the rear side member 75 is larger than the rear end outer peripheral edge of the front side member 73 with respect to the circular engaging step portion 77.

A projecting bar portion 78 projects from the central portion of the rear end surface 75a of the rear side member 75. Engaging steps 78a are formed on the outer peripheral surface of the projecting bar portion 78, the engaging steps 78a being continuously inclined towards the rear end surface 75a. The eyeball 71 is formed of a substantially hemispherical hollow structure or frame made of synthetic resin material, and the projecting bar portion 78 has a split 79 formed therein from the base portion to the rear end thereof. The eyeball 71 is provided with an eyelash 80 on the upper portion of the hemispherical hollow structure or frame. A pupil 81 is formed on a portion of the hemispherical hollow structure below the eyelash 80. Pivot pins 82 are provided projecting outwardly on both sides of the structure corresponding to both ends of a diameter line passing through the center of the substantially hemispherical hollow structure or frame. A weight 83 is fixed rigidly onto the bottom portion of an inner surface of the eyeball 71 and is biased toward the rear of the eyeball 71. The pivot pins 82 of the eyeball 71 engage with the engaging grooves 84 oppositely provided on the inner surface of the eyeball-mounting body 72. The eyelash 80 is exposed from the opening 74. The eyeball 71 is rotatably set into the eyeball-mounting body 72 on the pivot pins 82. The eyelash 80 is engaged with an upper edge of the opening 74 when the eye is in the open condition and is engaged with the lower edge of the opening 74 when the eye is in the closed condition.

The eye member 65, to be mounted on the eye member-mounting portion 67 of the front surface of the stuffed doll's face, is attached in such a manner as mentioned below.

The eye member 65 is inserted into the aperture 67a the eye member-mounting portion 67 and then the projecting bar portion 78 is inserted into the inserting hole 69 while the inserting hole 69 is gradually spread by the pushing force of the projecting bar portion 78, at the same time, the projecting bar portion 78 being radially reduced due to the split 79 provided therein, by said pushing force, and as a result, the projecting bar portion 78 projects beyond the surface of the rear side portion of the hemispherical hollow structure or frame and thereafter the projecting bar portion 78 is elastically restored.

The periphery of the aperture 67a of the cloth abuts on the outer surface of the eye member 65 and also on the inner surface of the synthetic resin cup-shaped mounting member 66. The periphery of the aperture 67a of the eye member-mounting portion 67 of the cloth is held between the circular engaging step portion 77 of the eye member 65 and the inner surface of the synthetic resin cup-shaped mounting member 66.

The flange portion 68a of the synthetic resin cup-shaped mounting member 66 is abutting to the back surface of the eye member-mounting portion 67 of the cloth, the engaging steps 78a of the projecting bar portion 78 being engaged with the periphery of the inserting hole 69.

As a result, the eye member 65 is rigidly set by the synthetic resin cup-shaped mounting member 66.

In such a manner, the eye member 65 does not detach from the doll body even if the eye member 65 is strongly forced or urged from the front surface of the doll face, since the engaging stepa 78a of the projecting bar portion 78 engage with the periphery of the inserting hole 69 and the aperture 67a of the eye member-mounting portion 67 is held rigidly between the outer surface of the eye member 65 and the inner surface of the synthetic resin cup-shaped mounting member 66.

Further, since the projecting bar portion 78 of the eye member 65 has the split 79, it is possible to easily insert the projecting bar portion 78 into the inserting hole 69, by which the assembling work is much improved.

A fifth embodiment of the present invention will be described referring to FIGS. 23 through 25, in which an eye device 85 is composed of an eye member 86 and a synthetic resin cup-shaped mounting member 87 and is provided on the surface at the front side of an eye member-mounting portion 88 of a material fabric or cloth for a doll face having an aperture 88a therethrough.

Figure 24:
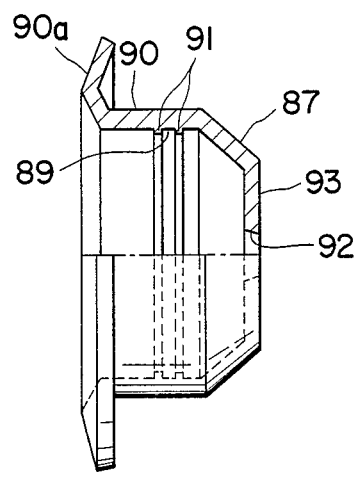
FIG. 24 is a side view of the synthetic resin cup-shaped mounting member showing the cross section of the upper half portion in the fifth embodiment.
Figure 25:
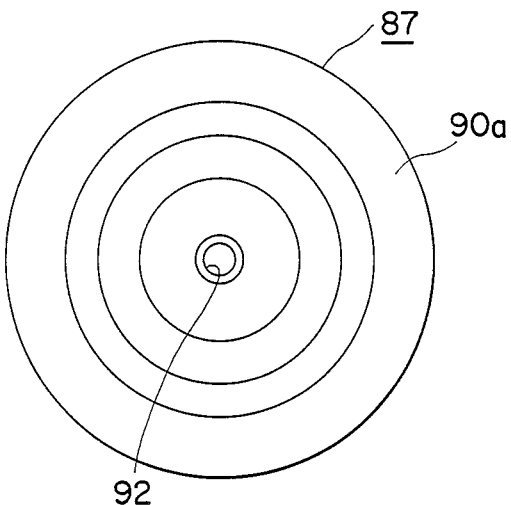
FIG. 25 is a front view of the synthetic resin cup-shaped mounting member in the fifth embodiment.

As shown in FIG. 24 and FIG. 25, the synthetic resin cup-shaped mounting member 87 is provided with a circular engaging groove 89 on an inner peripheral surface, the circular engaging groove 89 being formed in a rear portion of a peripheral wall portion 90 having a circular flange portion 90a and also being formed between circular projecting steps 91.

The synthetic resin cup-shaped mounting member 87 is also provided with an inserting hole 92 which is tapered toward the outside of the central portion of the rear end wall portion 93.

Figure 23:
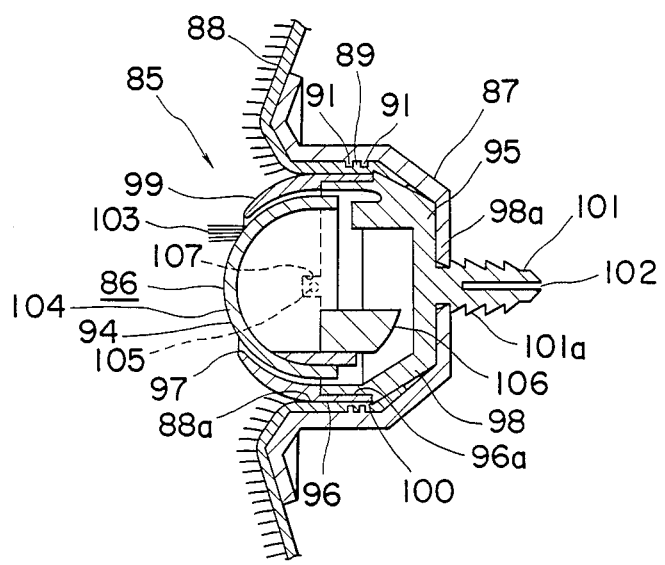
FIG. 23 is a vertical cross-sectional view showing a fifth embodiment of the present invention.

Referring to FIG. 23, the eye member 86 is constructed so that an eyeball 94 is mounted inside of an eyeball-mounting body 95, which comprises a front side member 96 having an opening 97 of an ellipse shape or a round shape, and a rear side member 98 which is fitted at a fitting step portion 96a of the front side member 96, which forms the eye edge cosmetic portion 99. A circular engaging step portion 100 is formed at the front end outer peripheral edge of the rear side member 98.

The front end outer peripheral edge of the rear side member 98 is larger than the rear end outer peripheral edge of the front side member 96 with respect to the circular engaging step portion 100.

The projecting bar portion 101 projects from the central portion of a rear end surface 98a of the rear side member 98. Engaging steps 101a are formed on the outer peripheral surface of the projecting bar portion 101, the engaging steps 101a being continuously inclined towards the rear end surface 98a. The eyeball 94 is formed of a substantially hemispherical hollow structure or frame made of synthetic resin material, and the projecting bar portion 101 has a split 102 formed therein form the base portion to the rear end thereof. The eyeball 94 is provided with an eyelash 103 on the upper portion of the hemispherical hollow structure or frame. A pupil 104 is formed on a hemispherical hollow structure below the portion of the eyelash 103. Pivot pins 105 are provided projecting outwardly on both sides of the structure corresponding to both ends of a diameter line passing through the center of the substantially hemispherical hollow structure or frame. A weight 106 is fixed rigidly on the bottom portion of an inner surface of the eyeball 94 and is biased toward the rear of the eyeball 94. The pivot pins 105 of the eyeball 94 engage with the engaging grooves 107 oppositely provided on the inner surface of the eyeball-mounting body 95. The eyelash 103 is exposed from the opening 97. The eyeball 94 is rotatably set into the eyeball-mounting body 95 on the pivot pins 105. The eyelash 103 is engaged with an upper edge of the opening 97 when the eye is in the open condition and is engaged with the lower edge of the opening 97 when the eye is in the closed condition.

The eye member 86, to be mounted on the eye member-mounting portion 88 of the front surface of the stuffed doll's face, is attached in such a way as mentioned below.

The eye member 86 is inserted into the aperture 88a of the eye member-mounting portion 88 and then the projecting bar portion 101 is inserted into the inserting hole 92 while the inserting hole 92 is gradually spread by the pushing force of said projecting bar portion 101 and at the same time, the projecting bar portion 101 is radially reduced due to the split 102 provided therein, by the pushing force, and as a result, the projecting bar portion 101 projects beyond the surface of the rear side portion of the semi-ball hollow skull or frame, and thereafter the projecting bar portion 101 is elastically restored.

The periphery of the aperture 88a of the cloth abut on the outer surface of the eye member 86 and also on the inner surface of the synthetic resin cup-shaped mounting member 87. The periphery of the eye member-mounting portion 88 is held between the circular engaging step portion 100 of the eye member 86 and the circular engaging groove 89 formed between circular projecting steps 91 of the synthetic resin cup-shaped mounting member 87.

The flange portion 90a of the synthetic resin cup-shaped mounting member 87 abuts on the back surface of the eye member-mounting portion 88 of the cloth, the engaging steps 101a of the projecting bar portion 101 being engaged with the periphery of the inserting hole 92.

As a result, the eye member 86 is rigidly set by the synthetic resin cup-shaped mounting member 87.

In such a manner, the eye member 86 does not come off from the doll body even if the eye member 86 is strongly forced or urged from the front surface of the doll face, since the engaging steps 101a of the projecting bar portion 100 engage with the periphery of the inserting hole 92 and the aperture 88a of the eye member-mounting portion 88 is held rigidly between the circular engaging step portion 100 of the eye member 86 and the circular engaging groove 89 of the synthetic resin cup-shaped mounting member 87.

Further, since the projecting bar portion 101 of the eye member 86 has the split 102 therein, it is passible to easily insert the projecting bar portion 101 into the inserting hole 92, by which the assembling work is much improved.

A sixth embodiment of the present invention will be described referring to FIGS. 26 through 28, in which an eye device 108 is composed of an eye member 109 and a synthetic resin cup-shaped mounting member 110 and being provided on the surface at the front side of an eye member-mounting portion 111 of a material fabric or cloth for a doll face having an aperture 111a therethrough.

Figure 27:
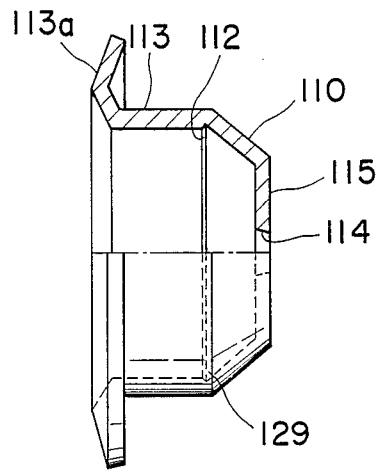
FIG. 27 is a side view of the synthetic resin cup-shaped mounting member showing the cross section of the upper half portion in the sixth embodiment.
Figure 28:
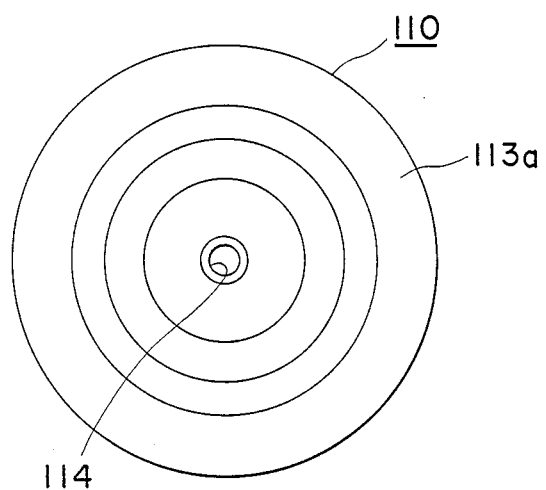
FIG. 28 is a front view showing a doll in the standing posture to which the eye device of the present invention is applied.

As shown in FIG. 27 and FIG. 28, the synthetic resin cup-shaped mounting member 110 is provided with a circular engaging groove 112 on an inner peripheral surface, the groove 112 being formed in a rear portion of a peripheral wall portion 113 having a circular flange portion 113a.

The synthetic resin cup-shaped mounting member 110 is also provided with an inserting hole 114 which is tapered toward the outside of a central portion of a rear end wall portion 115.

Figure 26:
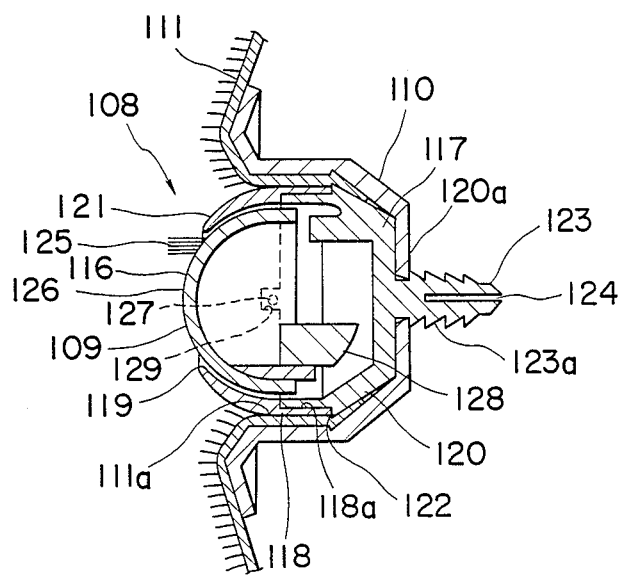
FIG. 26 is a vertical cross-sectional view showing a sixth embodiment of the present invention.

Referring to FIG. 26, the eye member 109 is constructed so that an eyeball 116 is mounted inside of an eyeball-mounting body 117, which comprises a front side member 118 having an opening 119 of an ellipse shape or round shape, and a rear side member 120 which is fitted at a fitting step portion 118a of the front side member 118, which forms the eye edge cosmetic portion 121. A circular engaging step portion 122 is formed at the front end outer peripheral edge of the rear side member 120.

The front and outer peripheral edge of the rear side member 120 is larger than the rear end outer peripheral edge of the front side member 118 with respect to the circular engaging step portion 122.

A projecting bar portion 123 projects from the central portion of a rear end surface 120a of a rear side member 120. Engaging steps 123a are formed on the outer peripheral surface of the projecting bar portion 123, the engaging steps 123a being continuously inclined towards the rear end surface 120a. The eyeball 116 is formed of a substantially hemispherical hollow structure or frame made of synthetic resin material, and the projecting bar portion 123 has a split 124 formed therein from the base portion to the rear end. The eyeball 116 is provided with an eyelash 125 on an upper portion of the hemispherical hollow structure or frame. A pupil 126 is formed on a hemispherical hollow structure below the portion of the eyelash 125. Pivot pins 127 are provided projecting outwardly on both side of the structure corresponding to both ends of a diameter line passing through the center of the substantially hemispherical hollow structure or frame. A weight 128 is fixed rigidly onto the bottom portion of an inner surface of the eyeball 116 and is biased toward the rear of the eyeball 116. The pivot pins 127 of the eyeball 116 engage with the engaging grooves 129 oppositely provided on the inner surface of the eyeball-mounting body 117. The eyelash 125 is exposed from the opening 119. The eyeball 116 is rotatably set into the eyeball-mounting body 117 on the pivot pins 127. The eyelash 125 is engaged with an upper edge of the opening 119 when the eye is in the open condition and is engaged with the lower edge of the opening 119 when the eye is in the closed condition.

The eye member 109, to be mounted on the eye member-mounting portion 111 of the front surface of the stuffed doll's face, is attached in such a manner as mentioned below.

The eye member 109 is inserted into the aperture 111a of the eye member-mounting portion 111 and then the projecting bar portion 123 is inserted into the inserting hole 114 while the inserting hole 114 is gradually spreaded by the pushing force of said projecting bar portion 123 and, at the same time, the projecting bar portion 123 is radially reduced through the split 124 provided therein by the pushing force, and, as a result, the projecting bar portion 123 projects beyond the surface of the rear side portion of the hemispherical hollow structure or frame, and thereafter the projecting bar portion 123 is elastically restored.

The periphery of the aperture 111a of the cloth abuts on the outer surface of the eye member 109 and on the inner surface of the synthetic resin cup-shaped mounting member 110. The periphery of the eye member-mounting portion 111 is held between the circular engaging step portion 122 of the eye member 109 and the circular engaging groove 112 of the synthetic resin cup-shaped mounting member 110.

The flange portion 113a of the synthetic resin cup-shaped mounting member 110 abuts on the back surface of the eye member-mounting portion 111 of the cloth, the engaging steps 123a or the projecting bar portion 123 being engaged with the periphery of the inserting hole 114.

As a result, the eye member 109 is rigidly set by the synthetic resin cup-shaped mounting member 110.

In such a manner, the eye member 109 does not come off from the doll body even if the eye member 109 is strongly forced or urged from the front surface of the doll face, since the engaging steps 123 of the projecting bar portion 123 engage with the periphery of the inserting hole 114 and the aperture 111a of the eye member-mounting portion 111 is held rigidly between the circular engaging step portion 123a of the eye member 109 and the circular engaging groove 112 of the synthetic resin cup-shaped mounting member 110.

Further, since the projecting bar portion 123 of the eye member 109 has the split 124 therein, it is possible to easily insert the projecting bar portion 1223 into the inserting hole 114, by which the assembling work is much improved.

Figure 29:
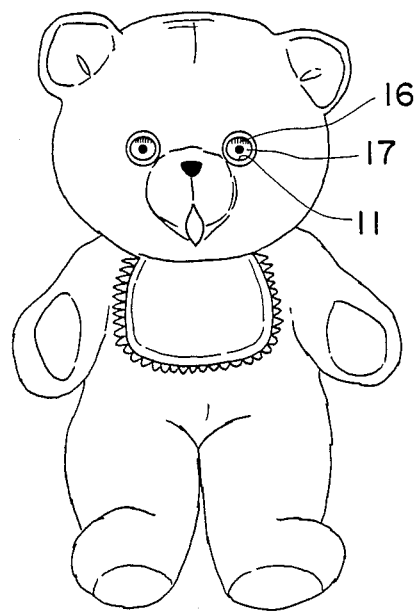
Figure 30:
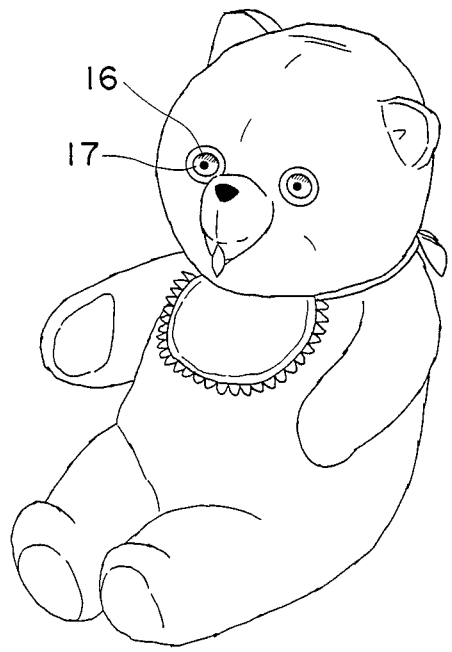
FIG. 30 is a perspective view showing a doll in the sitting posture to which the eye device of the present invention is applied.

In the stuffed doll with the eye device of the present invention mounted therein, when the stuffed doll is in the standing or sitting posture, it is in the eye-open condition in which the eyelash abuts on the upper edge of the opening due to the weight (refer to FIG. 29 and FIG. 30).

Figure 31:
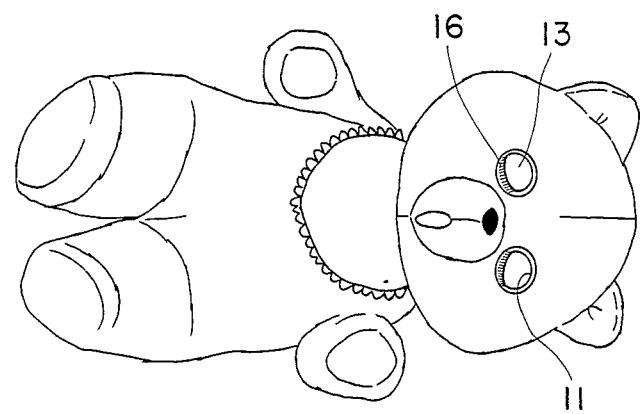
FIG. 31 is a plan view showing a doll in the lying posture to which the eye device of the present invention is applied.
Figure 32:
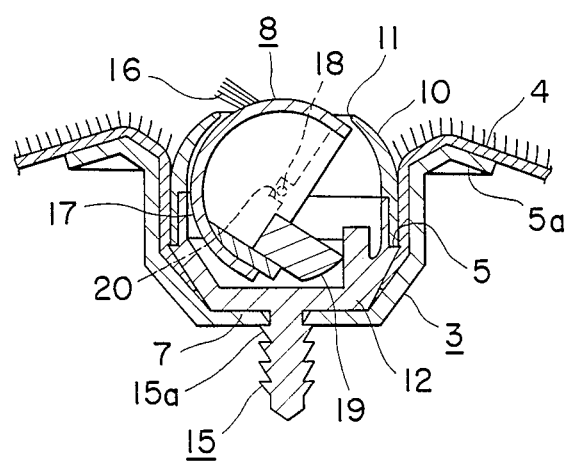
FIG. 32 is a vertical cross-sectional view showing the eye device of the present invention in the lying posture of the doll.

When the stuffed doll is changed into the lying state, the stuffed doll is in the eye-closed condition by the operation that the eyeball is rotated until the eyelash abuts on the lower edge of the opening by the weight, because the eyeball is rotated at the pivot pins rotatably mounted to the engaging grooves at its both ends (refer to FIG. 31 and FIG. 32).

FIGS. 29, 30, 31 and 32 show, respectively, the stuffed dolls to which the first embodiment of the present invention is applied and in which the same reference numerals indicate, respectively, the same members or portions.

I claim:

1. An eye device for use in a doll comprising a synthetic resin cup-shaped mounting member having a circular engaging groove on an inner periphery of a wall portion of the mounting member and having a flange portion fomred on a peripheral edge of the mounting member and having an inserting hole which is tapered toward an outside of a central portion of a rear end wall portion of the mounting member; and an eye member including an eyeball and an eyeball-mounting body which has a circular engaging step portion on an outer periphery of the eyeball-mounting body, said circular engaging groove and said circular engaging step portion to cooperate to engage and secure doll facial fabric, said eyeball mounting body being provided with a projecting bar portion which has at least one engaging step on an outer periphery of the projecting bar portion, said projecting bar portion being arranged to engage said inserting hole in said cup-shaped mounting member, wherein said eyeball is rotatably mounted in engaging grooves in the eyeball-mounting body by means of pivot pins on said eyeball, said eyeball including a weight fixed rigidly on a bottom portion of an inner surface of the eyeball and biased toward the rear of the eyeball.

2. An eye device for use in a doll comprising a synthetic resin cup-shaped mounting member having a circular engaging groove formed between circular projecting steps on an inner periphery of a wall portion of the mounting member and having a flange portion formed on a peripheral edge of the mounting member and having an inserting hole which is tapered toward an outside of a central portion of a rear end wall portion of the mounting member; and an eye member including an eyeball and an eyeball-mounting body which has a circular engaging step portion on an outer periphery of the eyeball-mounting body, said circular engaging groove and said circular engaging step portion to cooperate to engage and secure doll facial fabric, said eyeball-mounting body being provided with a projecting bar portion which has at least one engaging step on an outer periphery of the projecting bar portion, said projecting bar portion being arranged to engage said inserting hole in said cup-shaped mounting member, wherein said eyeball is rotatably mounted in engaging grooves in the eyeball-mounting body by means of pivot pins on said eyeball, said eyeball including a weight fixed rigidly on a bottom portion of an inner surface of the eyeball and biased toward the rear of the eyeball.

3. An eye device for use in a doll comprising a synthetic resin cup-shaped mounting member having a circular engaging groove on an inner periphery of a wall portion of the mounting member and having a flange portion fomred on a peripheral edge of the mounting member and having an inserting hole which is tapered toward an outside of a central portion of a rear end wall portion of the mounting member; and an eye member including an eyeball and an eyeball-mounting body which has a circular engaging step portion on an outer periphery of the eyeball-mounting body, said circular engaging groove and said circular engaging step portion to cooperate to engage and secure doll facial fabric, said eyeball mounting body being provided with a projecting bar portion which has at least one engaging step on an outer periphery of the projecting bar portion and which has a split formed therein from a rear end to a base portion of the projecting bar portion, said projecting bar portion being arranged to engage said inserting hole in said cup-shaped mounting member, wherein said eyeball is rotatably mounted in engaging grooves in the eyeball-mounting body by means of pivot pins on said eyeball, said eyeball including a weight fixed rigidly on a bottom portion of an inner surface of the eyeball and biased toward the rear of the eyeball.

4. An eye device for use in a doll comprising a synthetic resin cup-shaped mounting member having a circular engaging groove formed between circular projecting steps on an inner periphery of a wall portion of the mounting member and having a flange portion formed on a peripheral edge the mounting member and also having an inserting hole which is tapered toward and outside of a central portion of a rear end wall portion of the mounting member; and an eye member including an eyeball and an eyeball-mounting body which has a circular engaging step portion on an outer periphery of the eyeball-mounting body, said circular engaging groove and said circular engaging step portion to cooperate to engage and secure doll facial fabric, said eyeball mounting body being provided with a projecting bar portion which has at least one engaging step on an outer periphery of the bar portion and which has a split formed therein from a rear end to a base portion of the projecting bar portion, said projecting bar portion being arranged to engage said inserting hole in said cup-shaped mounting member, wherein said eyeball is rotatably mounted in engaging grooves in the eyeball-mounting body by means of pivot pins on said eyeball, said eyeball including a weight fixed rigidly on a bottom portion of an inner surface of the eyeball and biased toward the rear of the eyeball.

* * * * *